US005093180A

United States Patent [19]

Morgan

[11] Patent Number: 5,093,180

[45] Date of Patent: Mar. 3, 1992

[54] LIQUID TRANSFER ARTICLES AND METHOD FOR PRODUCING THEM

[75] Inventor: Russell M. Morgan, Indianapolis, Ind.

[73] Assignee: Union Carbide Coatings Service Technology Corporation, Danbury, Conn.

[21] Appl. No.: 346,573

[22] Filed: May 2, 1989

[51] Int. Cl.[5] .................. B32B 3/00; A01B 29/00; B41F 7/02

[52] U.S. Cl. .................. 428/156; 428/141; 428/172; 428/212; 428/218; 428/210; 428/332; 428/472; 428/472.2; 428/450; 428/698; 428/702; 29/121.1; 29/132; 101/217; 101/328; 101/348; 101/375

[58] Field of Search .............. 428/150, 906, 698, 702, 428/409, 172, 212, 218, 332, 210, 131, 141, 450, 469, 472.2, 472; 29/160, 121.1, 120, 121.8, 121.6, 121.7, 132; 430/307; 101/217, 328, 348, 375; 264/293; 425/385

[56] References Cited

U.S. PATENT DOCUMENTS 4,787,837 11/1988 Bell .................. 425/385

FOREIGN PATENT DOCUMENTS 2049102 12/1980 United Kingdom .

OTHER PUBLICATIONS

"Roll Superfinishing with Coated Abrasives" Carbide and Tool Journal Mar./Apr. pp. 4–8, Alan P. Dimberg.

*Primary Examiner*—Ellis P. Robinson
*Assistant Examiner*—Donald J. Loney
*Attorney, Agent, or Firm*—Cornelius F. O'Brien

[57] ABSTRACT

The invention relates to a liquid transfer article, such as a printing roll, having a laser-engraved coated surface comprised of wells adapted to receive a liquid and land areas adapted to be wiped free of any liquid prior to contacting a receiving surface so that only the liquid in the wells are transferred. The land areas of the coated surface have a density of greater than 95% theoretical and a roughness of less than 6 micro-inches $R_a$ to insure that any unwanted liquid on the land areas can be wiped clean prior to contacting a receiving surface. The invention also relates to a method for producing the liquid transfer article.

7 Claims, 1 Drawing Sheet

LIQUID TRANSFER ARTICLES AND METHOD FOR PRODUCING THEM

FIELD OF THE INVENTION

The present invention relates to a process for producing a liquid transfer article for use in transferring an accurately metered quantity of a liquid to another surface, for example, such as a roll for use in gravure printing processes. The present invention also relates to the article produced by the process. The liquid transfer article is produced by coating a substrate with a ceramic or metallic carbide layer having a density of greater than 95% theoretical; followed by directing a laser beam of radiation onto the coated surface to produce on the coated surface a pattern of depressions or wells adapted for receiving liquid; and then finishing the laser engraved coated surface to a roughness of less than 6 micro-inches $R_a$, preferably less than 4 micro-inches $R_a$.

BACKGROUND OF THE INVENTION

A liquid transfer article, such as an impression roll, is used in the printing industry to transfer a specified amount of a liquid, such as ink or other substance, from the liquid transfer article to another surface. The liquid transfer article generally comprises a surface with a pattern of depressions or wells adapted for receiving a liquid and in which said pattern is transferred to another surface when contacted by the liquid transfer article. When the liquid is ink and the ink is applied to the article, the wells are filled with the ink while any ink on the remaining surface or land area of the article is wiped off. Since the ink is contained only in the pattern defined by the wells, it is this pattern that is transferred to another surface.

In commercial practice, a wiper or doctor blade is used to remove any excess liquid from the land area of the liquid transfer article. If the surface of the coated article is too coarse, excessive liquid, such as ink, will not be completely removed from the coarse land area of the article thereby resulting in the transfer of too much ink onto the receiving surface and/or onto the wrong place of the receiving surface. Therefore, the surface of the liquid transfer article should be smooth and the wells clearly defined so that they can accept the liquid.

Gravure type rolls are commonly used as liquid transfer rolls. Gravure-type rolls are also referred to as applicators or pattern rolls. A gravure roll is produced by cutting or engraving various sizes of wells into portions of the roll surface. These wells are filled with liquid and then the liquid is transferred to a receiving surface. The diameter and depth of the wells may be varied to control the volume of liquid transfer. It is the location of the wells that provide a pattern of the liquid to be transferred to the receiving surface while the land area defining the wells do not contain any liquid and therefore should not transfer any liquid. The land area is at a common surface level such that when liquid is applied to the surface and the liquid fills or floods the wells, excess liquid can be removed from the land areas by wiping a doctor blade across the roll surface.

The depth and size of the wells determines the amount of liquid which is transferred to the receiving surface. By controlling the depth and size of the wells, and the location of the wells (pattern) on the surface, a precise control of the volume of liquid to be transferred and the location of the liquid to be transferred to a receiving surface can be achieved. In addition, the liquid may be transferred to a receiving surface in a predetermined pattern to a high degree of precision having different print densities by having various depth and/or sizes of wells.

Typically, gravure rolls are a metal with an outer layer of copper. Generally, the engraving techniques employed to engrave the copper are mechanical processes, e.g., using a diamond stylus to dig the depression patterns, or photochemical processes that chemically etch the depression pattern. After completion of the engraving, the copper surface is usually plated with chrome. This last step is required to improve the wear life of the engraved copper surface of the roll. Without the chrome plating, the rolls wear quickly, and are more easily corroded by the inks used in the printing industry. For this reason, without the chrome plating, the copper rolls generally have an unacceptably low life.

However, even with chrome plating, the life of the rolls is often unacceptably short. This is due to the abrasive nature of the fluids and the scrapping action caused by the doctor blade. In many applications, the rapid wear of the rolls is compensated by providing oversized rolls with wells having oversized depth. However, these rolls have the disadvantage of higher liquid transfer when the rolls are new. In addition, as the rolls wear, the volume of liquid transferred to a receiving surface rapidly decreases thereby causing quality control problems. The rapid wear of the chrome-plated copper rolls also results in considerable downtime and maintenance costs.

Ceramic coatings have been used for many years for anilox rolls to give extremely long life. Anilox rolls are liquid transfer rolls which transfer a uniform liquid volume over the entire working surface of the roll. Engraving of ceramic coated rolls cannot effectively be done with the conventional engraving methods used for engraving copper rolls. Consequently, ceramic coated rolls are generally engraved with a high energy beam, such as a laser or an electron beam. Laser engraving results in the formation of a well with a new recast surface above the original surface of the roll, such recast surface having an appearance of a miniature volcano crater. This is caused by solidification of the molten material thrown from the surface when struck by the high energy beam. Specifically, recast is coating material surrounding a laser-engraved well which was not vaporized by the energy beam and which material resolidifies.

The recast surface does not significantly effect the function of an anilox roll because the complete anilox roll is engraved and has no pattern. However, in gravure printing processes where a liquid transfer pattern is required, the recast surface causes significant problems. The major difference between a gravure roll and an anilox roll is that the entire anilox roll surface is engraved whereas with a gravure roll only portions of the roll are engraved to form a predetermined pattern. In order for the gravure roll to transfer liquid in a controlled manner determined by the pattern, fluid has to be completely wiped from the unengraved land areas by a doctor blade. Any fluid remaining on the land areas after being wiped with a doctor blade will be deposited on the receiving surface where it is not desired. With a laser engraved ceramic roll, the doctor blade cannot completely remove liquid from the land area due to the recast surfaces or porosity of the land areas which retain some of the liquid. Although the recast surfaces should be removed for most printing applications, the porosity of the land area is still a major problem since liquid can be trapped on the land area and transferred to a receiving surface. This problem is particularly severe at transition zones between adjacent wells and patterns where the liquid tends to smear onto the land areas where it should not be.

It is an object of the present invention to provide a low porosity, high density ceramic or metallic carbide coated laser-engraved liquid transfer article, such as an impression roll, which has land areas which can easily and efficiently be wiped clean of a liquid and a plurality of wells for retaining a metered amount of liquid that can be transferred to a suitable receiving surface.

Another object of the present invention is to provide a process for producing a low porosity, high density ceramic or metallic carbide coated laser engraved liquid transfer article.

SUMMARY OF THE INVENTION

The invention relates to a liquid transfer article coated with a material selected from the group consisting of ceramic and metallic carbides, the coated surface of said liquid transfer article comprises a first portion containing a plurality of laser engraved wells adapted for receiving a liquid and said wells defining a pattern, and a second portion comprising land areas that have a surface hardness of at least 800 $HV_{0.3}$, preferably 1000 $HV_{0.3}$, a density of greater than 95% theoretical, preferably greater than 97%, and a surface roughness of less than about 6 micro-inches $R_a$, preferably less than about 4 micro-inches $R_a$. As used herein, $R_a$ is the average surface roughness measured in micro-inches by ANSI Method B46.1 1978. In this measuring system, the higher the number, the rougher the surface.

The land areas having these characteristics will exhibit little or no surface porosity and will enable liquid contacting the surface to be easily and efficiently wiped off using a conventional type doctor blade. Thus when liquid, such as ink, is deposited on the surface of the liquid transfer article, the liquid will flow into and remain in the wells while any excess liquid can be wiped off the surface of the land areas. This will insure that when the liquid transfer article is a gravure roll, the ink in the wells can be transferred to an appropriate surface while the area of the surface contacted by the land areas of the roll will be completely free of ink or ink smudges.

Another aspect of the invention relates to a method for producing a liquid transfer article for use in transferring liquid to another surface comprising the steps:

(a) coating an article with at least one layer of a material selected from the group consisting of ceramic and metallic carbide so that the surface of the coated layer has a density of at least 95% theoretical;

(b) engraving the coated surface with a beam of energy to produce a pattern of wells in a first portion of the surface with the second portion of the surface comprising land areas that were not contacted by the beam of energy; and (c) treating the laser-engraved coated surface to remove any recast formed around the wells by the beam of energy and to provide the surface of the land areas with a roughness of less than 6 micro-inches $R_a$, preferably less than about 4 micro-inches $R_a$.

Generally, after application of the coating and sealant if applied, it is finished by conventional grinding techniques to the desired dimensions and tolerances of the roll surface and for a roughness of about 20 micro-inches $R_a$ or less, preferably about 10 micro-inches $R_a$, in order to provide an even surface for a laser treatment. After laser engraving, the recast areas are finished to or below the original surface height of the coated article prior to laser engraving and the land areas are finished to provide a roughness of 6 micro-inches $R_a$, preferably 4 micro-inches $R_a$ or less. In less critical applications, small recast area may be tolerable.

As stated above a recast area is coating material surrounding a laser-engraved well which is not vaporized by the energy beam and which resolidifies. It has been found that the recast material may differ considerably from the original coating. In general, it may be denser and less porous than the original material. In multiphase coatings, the recast material typically appears to be a single phase. The removal of the recast material above the surface of the land area is generally required so as to allow a doctor blade to remove any liquid from remaining on the land areas. This will prevent unwanted liquid or liquid smudges from being transferred to a receiving surface in the wrong places.

Preferably after step (a) the following step could be added:

(a') sealing the coated article with a sealant.

A suitable sealant would be an epoxy sealant such as UCAR 100 sealant which is obtainable from Union Carbide Corporation, a New York Corporation. UCAR 100 is a trademark of Union Carbide Corporation for a thermosetting epoxy resin containing DGEBA. The sealant can effectively seal fine microporosity that may be developed during the coating process and therefore provide resistance to water and alkaline solutions that may be encountered during the use of the coated article while also providing resistance to contaminations that may be encountered during handling of the coated article.

Any suitable ceramic coating, such as a refractory oxide or metallic carbide coating may be applied to the surface of the roll. For example, tungsten carbide-cobalt, tungsten carbide-nickel, tungsten carbide-cobalt chromium, tungsten carbide-nickel chromium, chromium nickel, aluminum oxide, chromium carbide-nickel chromium, chromium carbide-cobalt chromium, tungsten-titanium carbide-nickel, cobalt alloys, oxide dispersion in cobalt alloys, aluminum-titania, copper based alloys, chromium based alloys, chromium oxide, chromium oxide plus aluminum oxide, titanium oxide, titanium plus aluminum oxide, iron based alloys, oxide dispersed in iron based alloys, nickel and nickel based alloys, and the like may be used. Preferably chromium oxide ($Cr_2O_3$), aluminum oxide ($Al_2O_3$), silicon oxide or mixtures thereof could be used as the coating material, with chromium oxide being the most preferred.

The ceramic or metallic carbide coatings can be applied to the metal surface of the roll by either of two well known techniques, namely, the detonation gun process or the plasma coating process. The detonation gun process is well known and fully described in U.S. Pat. Nos. 2,714,563; 4,173,685; and 4,519,840, the disclosures of which are hereby incorporated by reference. Conventional plasma techniques for coating a substrate are described in U.S. Pat. Nos. 3,016,447; 3,914,573; 3,958,097; 4,173,685; and 4,519,840, the disclosures of which are incorporated herein by reference. The thickness of the coating applied by either the plasma process or D-gun process can range from 0.5 to 100 mils and the roughness ranges from about 50 to about 1000 micro-inches $R_a$ depending on the process, i.e. D-gun or plasma, the type of coating material, and the thickness of the coating.

As stated above, the ceramic or metallic carbide coating on the roll can be preferably treated with a suitable pore sealant such as an epoxy sealant, e.g. UCAR 100 epoxy available from Union Carbide Corporation. The treatment seals the pores to prevent moisture or other corrosive materials from penetrating through the ceramic or metallic carbide coating to attach and degrade the underlying structure of the roll.

The coated roll is then finished to a roughness of 20 micro-inches or less before being laser engraved using a $CO_2$ laser in order to produce a suitable pattern defined by laser-formed wells in the surface of the coating material.

The volume of the liquid to be transferred is controlled by the volume (depth and diameter) of each well and the number of wells per unit area. The depths of the laser formed wells can vary from a few microns or less to as much as 120 to 140 microns or more. The average diameter of each well, of course, is controlled by the pattern and the number of laser-formed wells per lineal inch. Preferably the area on the surface of the article is divided into two portions. One portion comprises wells in a uniform pattern, such as a square pattern, a 30 degree pattern, or a 45 degree pattern with the number of laser formed wells per lineal inch typically being from 80 to 550 and the remaining second portion being free of wells land areas). The presence of recast upon the land areas would result in ink smearing into the well-free portion of the land areas when a doctor blade is passed over the surface to remove any liquid on the land area. By removing the recast material to produce smooth land areas between the wells, this problem is avoided.

A wide variety of laser machines are available for forming wells in the ceramic or metallic carbide coatings. In general, lasers capable of producing a beam or pulse of radiation of from 0.0001 to 0.4 joule per laser pulse for a duration of 10 to 300 microseconds can be used. The laser pulses can be separated by 30 to 2000 microseconds depending on the specific pattern of well desired. Higher or lower values of the energy and time periods can be employed and other laser-engraved techniques readily available in the art can be used for this invention. After laser-engraving, the roughness should typically range from 20 to 1000 micro-inches $R_a$ and the wells can range from 10 microns to 300 microns in diameter and from 5 microns to 250 microns in height.

After the laser treatment of the coated surface of the liquid transfer article, such as a roll, the coated surface can be finished to less than about 6 micro-inches $R_a$ using a microfinishing (also called superfinishing) technique, such as described in "Roll Superfinishing with Coated Abrasives," by Alan P. Dinsberg, in Carbide and Tool Journal, March/April 1988 publication. Microfinishing techniques can provide a predictable, consistent surface finish over the entire length of the engraved roll, and provide a surface free of recast so that all unwanted liquid can be effectively removed from the land areas by a doctor blade.

BRIEF DESCRIPTION OF THE DRAWINGS

FIGS. 1 and 2 show a conventional type cylindrical roll 2 having a substrate 4 made of steel and having a surface coating 6 of a ceramic. A portion of the coated surface is shown with a plurality of wells 8 found by a conventional laser engraving treatment. Specifically, the coated surface is laser engraved using a laser to produce in the coated layer a suitable pattern of wells 8 with each well 8 having a preselected volume so as to contain an amount of liquid to be transferred to a receiving surface. In practice, the number of wells would be significantly greater than that shown in the figures and grouped together so that to the human eye they would not be identifiable. The depths of the laser-formed well can vary from a few microns or less to as much as 200 microns or more. As shown in FIGS. 1 and 2, the laser engraving results in the formation of wells 8 with a new recast area 10 formed about each well 8. The recast surface has the appearance of a miniature volcano crater and is caused by solidification of the molten coating material that is thrown from the surface of the coated layer when the coated surface is struck by the high energy beam from the laser.

After the laser treatment of the coated surface of the liquid transfer article, the coated surface is finished to a roughness of less than about 6 micro-inches $R_a$ using a microfinishing technique as described above. The microfinishing technique provides a predictable, consistent surface finish over the entire length of the coated surface and effectively removes the recast area about each well. FIGS. 3 and 4 show the roll 2 of FIG. 1 after the finishing treatment has been completed in which the recast areas 10 have been removed so that a smooth surface is provided. The surface area 12 which is defined as the area contained in the surface plane parallel to the longitudinal axis 14 of roll 2 is referred to as the land area. As stated above, if the land area which includes the areas between adjacent wells, does not have the proper density so that the surface has undesirable porosity, then a doctor blade may not be successful in removing liquid from the land area. Any liquid remaining on the land area may be transferred to a receiving surface as an undesirable smudge or transferred to the receiving surface in the wrong areas.

Figure 1:
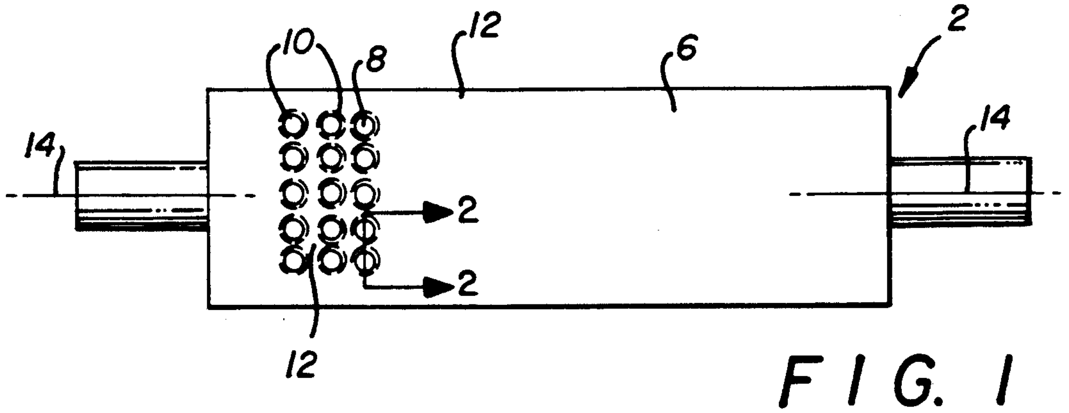
FIG. 1 is a side elevation view of a roll showing a laser-engraved pattern on the surface of the roll.
Figure 2:
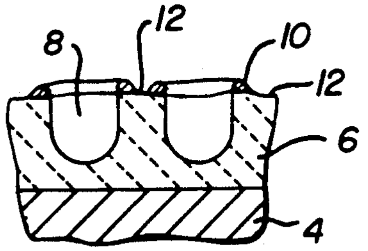
FIG. 2 is a cross sectional view of the roll in FIG. 1 taken through line 2—2.
Figure 3:
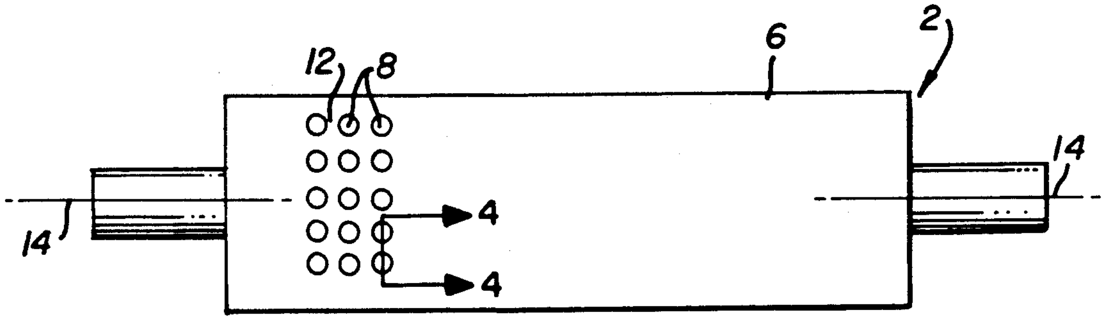
FIG. 3 is a side elevation view of the roll shown in FIG. 1 after the recast areas have been removed.
Figure 4:
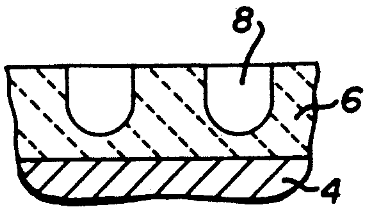
FIG. 4 is a cross sectional view of the roll in FIG. 3 taken through line 4—4.

In accordance with this invention the land areas have a density of greater than 95% theoretical and a surface roughness of less than about 6 micro-inches $R_a$, preferably less than about 4 micro-inches $R_a$. With the land areas having these characteristics, any liquid contained on the land areas can be easily and effectively removed by a doctor blade so that the only liquid transferred to a receiving surface will be the liquid contained in the wells 8. This will insure that the liquid will not be transferred to the wrong area of the receiving surface and also prevent unwanted smudges on the receiving surface.

A typical means for microfinishing the laser engraved coated roll would be to continuously move a film backed diamond tape over the surface of the roll. The tape speed and grit could be set for the desired recast removal rate and would be typically between 3 and 4 in/min 8 to 10 cm/min). As the abrasive tape is moved over the roll, the roll could also be rotated at a rotational speed of 50 to 100 rpm. The abrasive tape could be forced against the roll by conventional means and controlled so that a specific degree of roughness is obtained on the surface of the roll. The $R_a$ roughness on the roll could be continuously measured until a desired value is reached.

Although the preferable liquid to be transferred is ink, other suitable liquids could be employed such as liquid adhesives.

During the entire finishing process it is recommended that an accurate technique be employed that will permit constant measurement of the volume of the wells in the engraved area so that the desired liquid transfer volume of the wells in the coated roll surface be achieved. A preferred method for measuring liquid transfer volume is to apply a known volume of ink to the surface, and spread the ink over the surface to completely fill as many wells as possible. An ink impression is made of the inked area on the roll and the area of the image or ink plot on a receiving surface is then precisely measured. The known volume of the ink deposited on the roll is divided by the measured area of the transferred image with the quotient being the volumetric capacity of the roll. As a microliter of ink is one billion cubic microns, the unit is billions of cubic microns per square inch ($BCM/in^2$) if the ink volume is in microliters, and the area in square inches.

EXAMPLES

In the examples below, the transfer volume was measured as follows;

1. Using a pipette draw a 25 microliter sample of a water soluble ink.

2. Deposit ink upon the surface of the roll by slowly ejecting ink on the surface of the roll. The roll is aligned with its axis horizontal with the surface being measured placed at the top. The pipette is held at about a 45 degree angle while oscillating the ink from side to side over a distance of about three quarters of an inch while advancing it around the roll.

3. The ink is spread by passing a doctor blade slowly and steadily over the surface around the roll in a direction perpendicular to the roll axis. The doctor blade is passed in the same direction as the depositing of the ink such that the blade contacts the large portion of the ink deposit as opposed to the trailing section.

4. The ink image upon the surface of the roll is transferred to paper by laying transfer paper down over the ink area. While holding the paper tight to prevent slippage, rub the back of the paper to transfer ink from the wells in the roll to the receiving surface. It is not necessary to transfer all of the ink in the wells, since the goal is to obtain an image of the area filled by a known ink quantity. The paper is removed and the roll surface immediately cleaned with distilled water using a stainless steel cleaning brush. If the edge of the image has a feather edge, outline the image when dry with a felt tip black pen with the outer edge of the outline half way between the point of maximum image density and the point of image fade out.

5. The area of the image is measured by tracing the outline of the image with a planimeter using standard techniques. Alternately, area measurement, a manual method using a transfer paper with a grid of about 0.2 inches, or a computerized scanning technique may be used.

Example I

A roll with a 6.5 inch in diameter by 24 inch long cylindrical working surface was coated with $Cr_2O_3$ (chromium oxide) by the plasma spray process. The surface of the coating was ground to a finish of 18 $R_a$. The working surface was laser engraved with a $CO_2$ pulsed laser. The surface was divided into two portions, a first portion with a uniform pattern of laser wells, and a second portion with no laser indentations (land areas), to form over the entire surface a pattern of laser wells. The pattern of laser wells was formed by programming the laser to operate only over the patterned portion with the laser wells.

After forming the wells with the laser, the roll surface was microfinished using an abrasive of diamond particles upon a tape 4 inches in width. The abrasive tape was moved over the roll while pressure was applied. The roll was finished with 19 traversing passes of the tape across the roll surface. In Table A is shown the grit (average size in microns of the abrasive particles), the pressure at which the platen bears against the roll (measured as air pressure in a 1.5 inch-diameter cylinder that was used to force the tape against the roll surface).

TABLE A

| Pass | Grit (microns) | Pressure (psi) | $R_a$ (micro-inches) | Volume (BCM) |
|---|---|---|---|---|
| 1 | 45 | 60 | 16 | 27 |
| 2 | 45 | 60 | 16 | 25 |
| 3 | 45 | 60 | 13 | |
| 4 | 45 | 60 | 13 | 23 |
| 5 | 30 | 40 | 7 | |
| 6 | 30 | 40 | 7 | 20 |
| 7 | 15 | 40 | 5 | |
| 8 | 15 | 40 | 5 | 19.5 |
| 9 | 9 | 30 | 4 | |
| 10 | 9 | 30 | 4 | 19.0 |
| 11 | 6 | 30 | 3 | |
| 12 | 6 | 30 | 3 | 19.0 |
| 13 | 3 | 20 | 3 | |
| 14 | 3 | 20 | 3 | 18.5 |
| 15 | 3 | 15 | 3 | |
| 16 | 3 | 15 | 3 | 18.5 |
| 17 | 3 | 15 | 2 | |
| 18 | 3 | 15 | 2 | 18 |

After every second pass the $R_a$ and ink volume tests were done and the next two steps were repeated until the desired roughness was obtained. The roll was then used to transfer ink to a receiving surface and the ink transferred was only the ink contained in the wells and the area on the receiving surface corresponding to the land areas shows no sign of smudges or unwanted ink.

Sample rolls, each having its surface finished to a roughness of 7 micro-inches $R_a$ or higher (6 or fewer passes), were tested to see if a doctor blade could wipe clean the surface of each roll. In all samples where the surface roughness of each roll was 7 micro-inches $R_a$ or higher, the doctor blade left unwanted ink which could be transferred to a receiving surface in the wrong location. In other sample rolls in which each roll had its surface finished to a roughness of 5 micro-inches $R_a$ or less (7 or more passes), the doctor blade was able to wipe clean the surface of each roll so that no ink would be transferred to the receiving surface in the wrong location. When using a latex adhesive as the liquid medium, then the surface roughness should be finished in most applciations to 4 micro-inches $R_a$ or less to ensure that no unwanted adhesive remains on the surface after the surface is wiped by the doctor blade.

The invention has been described in detail with particular reference to preferred embodiments thereof, but it will be understood that variations and modifications can be effective within the spirit and scope of the invention.

What is claimed is:

1. A liquid transfer article coated with a material selected from the group consisting of ceramic and metallic carbide, said coated surface comprising a first portion containing a plurality of laser-engraved wells adapted for receiving a liquid and said wells being from 10 to 300 microns in diameter and from 5 to 250 microns in height, and a second portion comprising smooth land areas between said wells that have a density of greater than 95% theoretical, a surface roughness of less than about 6 micro-inches $R_a$ and a surface hardness of at least 800 $HV_{0.3}$.

2. The liquid transfer article of claim 1 wherein the surface roughness is less than about 4 micro-inches $R_a$.

3. The liquid transfer article of claim 1 wherein the coated material is selected from the group consisting of chromium oxide, aluminum oxide, silicon oxide and mixtures thereof.

4. The liquid transfer article of claim 1 wherein the article is steel coated with chromium oxide.

5. The liquid transfer article of claim 2, 3 or 4 wherein the density of the land areas is greater than 97% theoretical.

6. The liquid transfer article of claim 2, 3 or 4 wherein said article is a cylindrical roll.

7. The liquid transfer article of claim 2, 3 or 4 wherein said article is a cylindrical gravure roll.

* * * * *